(12) United States Patent
Dolenti et al.

(10) Patent No.: US 8,262,059 B2
(45) Date of Patent: Sep. 11, 2012

(54) HANDWHEEL TORQUE LIMITOR

(75) Inventors: William T. Dolenti, Lynchburg, VA
(US); Byron A. Fleury, St. James, NY
(US); William C. Hooss, Rustburg, VA
(US); Daniel J. Morris, Forest, VA (US)

(73) Assignee: Flowserve Management Company,
Irving, TX (US)

( * ) Notice: Subject to any disclaimer, the term of this
patent is extended or adjusted under 35
U.S.C. 154(b) by 689 days.

(21) Appl. No.: 12/227,091

(22) PCT Filed: May 4, 2006

(86) PCT No.: PCT/US2006/017431
§ 371 (c)(1),
(2), (4) Date: Aug. 23, 2009

(87) PCT Pub. No.: WO2007/130041
PCT Pub. Date: Nov. 15, 2007

(65) Prior Publication Data
US 2009/0302246 A1    Dec. 10, 2009

(51) Int. Cl.
*F16K 31/44*    (2006.01)
(52) U.S. Cl. .............. 251/81; 251/77; 251/79; 464/147; 464/149; 464/150; 464/153
(58) Field of Classification Search .................... 251/81, 251/77, 79, 58; 464/147, 149, 150, 151, 464/152, 153, 155
See application file for complete search history.

(56) References Cited

U.S. PATENT DOCUMENTS

| 557,943 | A | | 4/1896 | Bayley et al. |
| 2,485,942 | A | | 10/1949 | Turner |
| 2,608,377 | A | | 8/1952 | Streun |
| 3,330,167 | A | | 7/1967 | Yancey |
| 3,441,115 | A | | 4/1969 | Gunther |
| 3,701,362 | A | | 10/1972 | Reese |
| 3,706,321 | A | * | 12/1972 | Vicari ........................ 137/554 |
| 3,969,961 | A | * | 7/1976 | Amoroso ..................... 81/476 |
| 4,034,624 | A | | 7/1977 | Bianchini |
| 4,062,203 | A | | 12/1977 | Loenard et al. |
| 4,313,350 | A | | 2/1982 | Keller, III et al. |
| 4,407,326 | A | | 10/1983 | Wilhelm |
| 4,417,650 | A | * | 11/1983 | Geisthoff .................... 192/56.1 |
| 4,541,512 | A | * | 9/1985 | Beasant et al. ............. 192/56.57 |

(Continued)

FOREIGN PATENT DOCUMENTS

WO    2009144686 A1    12/2009

OTHER PUBLICATIONS

Great Britain Search Report for Application No. GB1106962.2, dated May 10, 2011 (1 page).

(Continued)

*Primary Examiner* — John K Fristoe, Jr.
*Assistant Examiner* — Minh Le
(74) *Attorney, Agent, or Firm* — TraskBritt

(57) ABSTRACT

A torque limiting device with an override mechanism coupled to a valve assembly capable of limiting the torque applied to the valve assembly and selectively being overridden to permit the application of excessive torque to the valve assembly. Tattletale devices capable of indicating when an override mechanism has been activated can also be integrated with the torque limiting device.

16 Claims, 3 Drawing Sheets

U.S. PATENT DOCUMENTS

| | | | |
|---|---|---|---|
| 4,619,437 A | 10/1986 | Williams et al. | |
| 4,692,075 A * | 9/1987 | Metz | 411/7 |
| 4,765,591 A | 8/1988 | Bodnar | |
| 4,773,240 A * | 9/1988 | Foshee | 70/222 |
| H636 H | 6/1989 | Elliott et al. | |
| 4,860,992 A | 8/1989 | Aunspach | |
| 5,120,913 A * | 6/1992 | Leach et al. | 200/50.26 |
| 5,211,274 A * | 5/1993 | Milano et al. | 192/45 |
| 5,295,907 A * | 3/1994 | Akkerman | 464/37 |
| 5,651,280 A * | 7/1997 | Park | 70/472 |
| 5,730,014 A * | 3/1998 | Berger et al. | 70/422 |
| 5,971,354 A | 10/1999 | Ecklund | |
| 6,112,619 A | 9/2000 | Campbell | |
| 7,503,443 B1 * | 3/2009 | Dobras | 192/48.6 |
| 7,584,936 B2 * | 9/2009 | Lewis et al. | 251/81 |
| 2002/0113445 A1 * | 8/2002 | Brown | 292/336.3 |
| 2004/0011408 A1 | 1/2004 | Campbell | |
| 2005/0087712 A1 | 4/2005 | Lymberopoulos | |
| 2005/0139445 A1 * | 6/2005 | Bosk | 192/66.2 |

OTHER PUBLICATIONS

Great Britain Search Report for Application No. GB1106963.0, dated May 12, 2011 (1 page).

Written Opinion of the International Searching Authority for International Application No. PCT/US06/17431, mailed Oct. 10, 2006.

International Search Report for PCT/US06/17431, dated Oct. 10, 2006, 2 pages.

* cited by examiner

HANDWHEEL TORQUE LIMITER

TECHNICAL FIELD

The present invention generally relates to valves and the operation of valve devices. More specifically, particular embodiments of the present invention relate to methods and apparatuses for limiting an amount of torque applied to an actuator, a valve, or a valve device.

BACKGROUND

Actuators and valve assembly components may be operated or driven by devices such as handwheel assemblies. The rotation of a handwheel in either a clockwise or counterclockwise direction imparts a rotational force on a drive shaft, which in turn, operates an actuator or valve assembly. For example, a handwheel device typically used to drive actuators and valve assemblies is illustrated in FIG. 1. Rotation of the handwheel drives a stem in or out of an actuator housing or valve assembly, thereby driving components contained therein. The use of handwheels and handwheel devices with actuators and valve assemblies is well known.

Actuators and valve assemblies driven by handwheels are typically subject to torque limitations. Application of torque beyond the torque limits of an actuator or valve assembly can damage the actuator or valve assembly. Once an excessive amount of torque has been applied to an actuator or a valve assembly, the device should be replaced.

To prevent damage caused by the excessive application of torque, warnings are usually printed in the user manuals that accompany the actuators or valve assemblies. In other instances, warnings may also be placed on actuator housings or on handwheels attached to an actuator in order to discourage an over-application of torque to the assembly. During operation, however, it is difficult, if not impossible, for an operator to monitor the amount of torque being applied to an actuator or valve assembly. This is especially true when an operator can only estimate the amount of torque that is being applied to a device based on their experience and on a feel for the amount of force that is being applied at any given time.

In many cases, there is no mechanism to prevent the application of an excessive amount of torque to an actuator or a valve assembly. More often than not, when excessive torque is applied to an actuator or valve assembly, the excessive torque causes damage to the actuator or valve assembly, resulting in the need for maintenance or replacement of the actuator or valve assembly. Therefore, it would be desirable to provide a mechanism by which an operator could be prevented from imparting an excessive amount of torque to an actuator or valve assembly by operation of a handwheel.

Although the application of excessive force and torque to an actuator or valve assembly is undesirable, emergency situations may arise which require such application. In those instances, the ability of an operator to override a mechanism preventing the application of an excessive amount of torque should not be hindered.

Furthermore, in many cases where damage to an actuator or valve assembly is caused by the application of excessive torque to a device, the manufacturer may be called upon to fix the device. The inability of the manufacturer to determine whether a device was damaged due to the application of an excessive amount of torque to the device or whether some other legitimate damage occurred is troublesome. Therefore, it is desirable to provide a mechanism by which manufacturers may monitor or determine when damage to an actuator or valve assembly has been caused by the application of excessive amounts of torque to the device rather than by a defect or normal wear-and-tear of the device.

Therefore, there is a need to provide a mechanism that limits the amount of torque applied to an actuator or valve assembly. It is also desirable to provide a mechanism for overriding or disengaging a torque limiting device so that excessive amounts of torque may be applied to an actuator or valve assembly if the need for such excessive torque is required. In addition, it is desirable to provide a mechanism that indicates when a torque limiting device has been disengaged or overridden.

DISCLOSURE OF INVENTION

According to embodiments of the present invention, a torque limiting device is provided with a valve assembly. Torque limiting devices according to embodiments of the present invention may limit the amount of torque applied to a valve assembly by an actuator or a handwheel.

According to some embodiments of the present invention, a torque limiting device may be affixed to a handwheel mechanism of a valve assembly to regulate the amount of torque that may be applied to the stem of the valve assembly by movement of the handwheel mechanism. In other embodiments, the torque limiting device may be affixed to an actuator associated with a valve assembly to regulate the amount of torque that may be applied to the stem of the valve assembly by the actuator.

In some embodiments, the torque limiting device may include a slip-clutch device capable of being disengaged when a predetermined or preset torque regulation limit has been reached, thereby preventing further application of torque to the valve stem. Upon the application of an acceptable torque limit, the slip-clutch may re-engage, thereby allowing torque to be applied to the stem of the valve assembly.

According to other embodiments of the present invention, the torque limits of the torque limiting device are adjustable. In some embodiments, the torque limit may be adjusted by altering the number of springs positioned in a spring set compartment of the torque limiting device. In other embodiments, shims may be added to or removed from the spring set compartment, thereby increasing or decreasing the torque limitations of the torque limiting device. In still other embodiments of the present invention, the torque limits may be adjusted by adjusting the position of a pressure nut of the torque limiting device, which, in turn, adjusts the pressure on springs and/or shims contained in a spring set compartment. A pressure nut may be loosened or tightened with respect to the spring set compartment to assert a force on the springs and/or shims contained within the spring set compartment. Further, the torque limits may be adjusted by adding or removing shims between a shell of the torque limiting device and an attachment bolt attaching a pressure nut to the torque limiting device. The distance between the pressure nut and the shell of the torque limiting device may dictate the amount of space within the spring set compartment, thereby dictating the amount of force applied to the springs and/or shims within the spring set compartment, which, in turn, provides the torque limits for the slip-clutch device.

In still other embodiments of the present invention, a torque limiting override mechanism is provided, wherein the torque limiting override mechanism allows the torque limiting device to be disengaged, bypassed, or otherwise removed. In some instances, activation of the torque limiting override mechanism allows torque above the set limits to be exerted on the stem of a valve assembly by a handwheel, an actuator, or other device. In some embodiments, the torque limiting override mechanism, once engaged, cannot be disengaged. The permanently engaged torque override mechanism provides evidence that the torque limits of the valve assembly may have been exceeded. In other embodiments, the torque override mechanism may be disengaged.

Tattletale devices capable of indicating when the torque limits of a torque limiting device have been exceeded are provided in other embodiments of the invention. In some embodiments, the tattletale device may be visible upon external inspection of an operating torque limiting device. In other embodiments, evidence of the tattletale may only appear upon disassembly of the torque limiting device. The presence of the tattletales allow valve manufacturers to determine if the torque limits of the valve assemblies may have been exceed at some previous time. Thus, when presented with a warranty claim or a failed valve assembly, the valve manufacturer can identify one possible source of the damage, which may limit warranty work or the manufacturer's liability.

BRIEF DESCRIPTION OF DRAWINGS

While the specification concludes with claims particularly pointing out and distinctly claiming that which is regarded as the present invention, this invention can be more readily understood and appreciated by one of ordinary skill in the art from the following description of the invention when read in conjunction with the accompanying drawings in which:

BEST MODE(S) FOR CARRYING OUT THE INVENTION

Embodiments of the present invention relate to torque limiting devices and more particularly to torque limiting devices capable of being coupled with or otherwise associated with a handwheel or actuator to limit torque applied by the handwheel or actuator to a valve assembly. In some embodiments, the torque limiting devices may include a torque limiting override mechanism capable of being activated to allow the torque limiting device to be bypassed. In still other embodiments, torque limiting devices of the present invention may include a "tattletale" device capable of indicating whether the torque limits of the torque limiting device have been previously exceeded.

Figure 1:
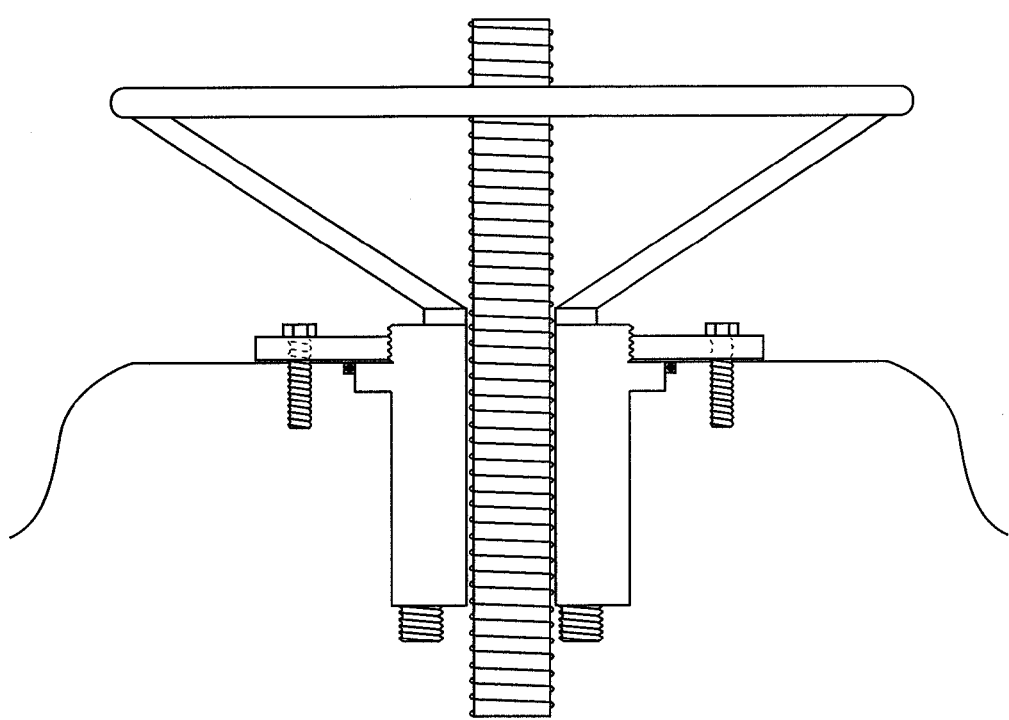
FIG. 1 illustrates a valve and handwheel assembly as known in the art.
Figure 2:
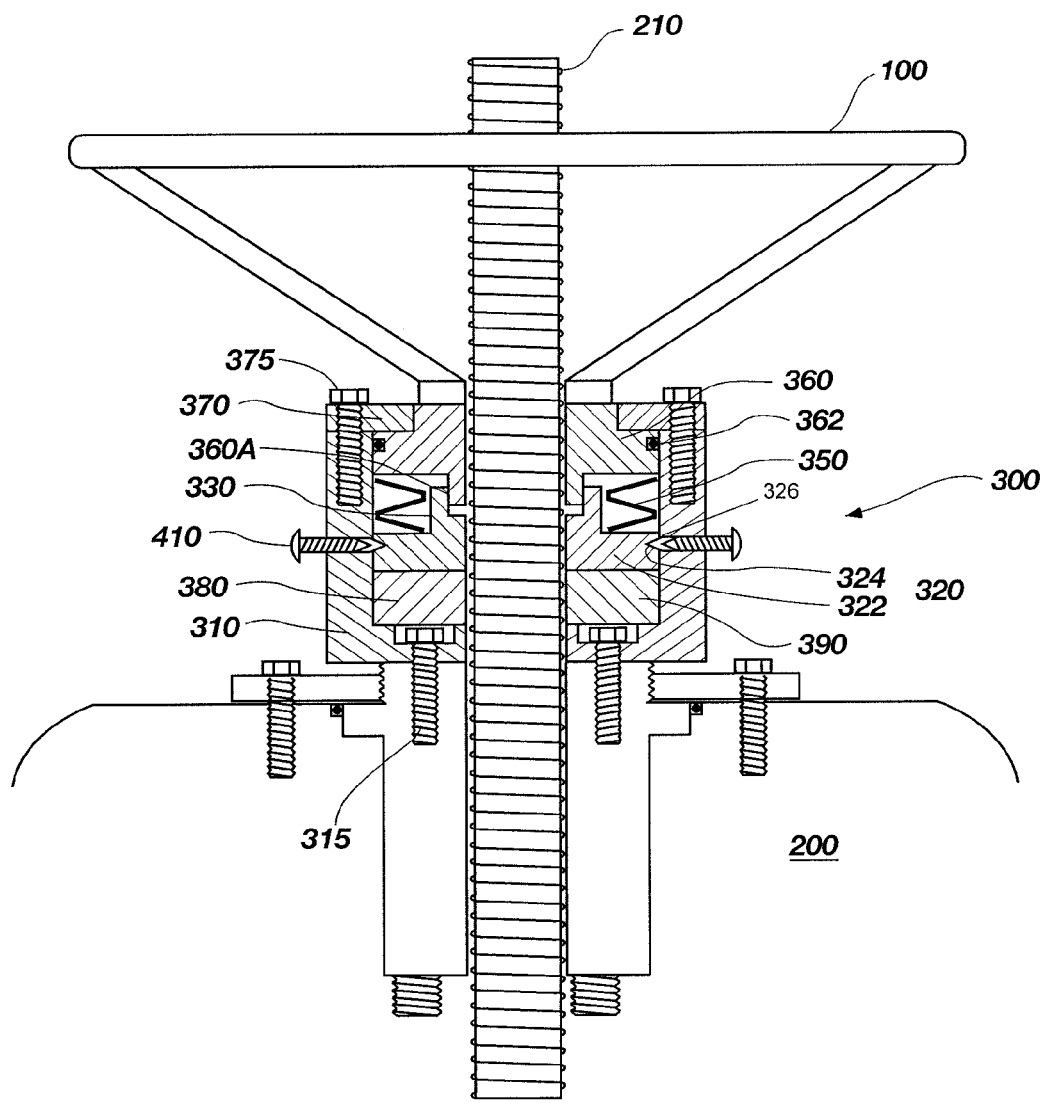
FIG. 2 illustrates a cross-sectional view of the components of a handwheel valve assembly including a torque limiting device according to particular embodiments of the present invention.

A torque limiting device 300 according to some embodiments of the invention is illustrated in FIG. 2. The torque limiting device 300 may be used with a valve assembly 200 and a handwheel 100 or, alternatively, an actuator (not shown), to limit the amount of force applied to the valve assembly 200 by use of the handwheel 100 or actuator. The torque limiting device 300 may be attached to the valve assembly 200 and the handwheel 100 or actuator such that the rotation of the handwheel 100 or actuator to drive the valve assembly 200 is limited by the torque limiting device 300.

A torque limiting device 300 according to embodiments of the present invention may include a housing 310 that is attached to the valve assembly 200. The housing 310 includes an opening therein to accommodate a valve stem 210 or other portion of a valve assembly 200, which may be acted upon by the torque limiting device 300. Within an interior space of the housing 310, the torque limiting device 300 can include a slip-clutch device 320, a drive mechanism 380 in communication with at least a portion of the slip-clutch device 320, one or more springs 350 applying a force to the slip-clutch device 320, and a restraining device (such as, for example, a pressure nut 360) defining the upper portion of the space wherein the springs 350 are located within the housing 310 and in communication with a handwheel 100 or an actuator.

According to particular embodiments of the invention, the handwheel 100 and the slip-clutch device 320 are in communication such that the rotation of the handwheel 100 or actuator creates rotation of at least a portion of the slip-clutch device 320. The rotation of the slip-clutch device 320 may, in turn, operate on the drive mechanism 380 to move a stem 210 or other component of the valve assembly 200. The springs 350 of the torque limiting device 300 limit the amount of torque that may be applied to the drive mechanism 380 to move the stem 210 by allowing the slip-clutch device 320 to slip when a predetermined torque is reached or exceeded.

Some embodiments of the present invention include a slip-clutch override mechanism, the details of which are described in more detail hereafter. The slip-clutch override mechanism enables disengagement of the slip-clutch device 320, allowing the transfer of torque from the handwheel 100 or actuator to the stem 210 without any limitations. In some embodiments, the slip-clutch override mechanism may not be disengaged after being activated without performing maintenance on the torque limiting device 300 and the valve assembly 200. In other embodiments, the slip-clutch override mechanism may be disengaged but a "tattletale" device or indicator is triggered by the activation of the slip-clutch override mechanism, thereby providing an indication that the torque limits of the device may have been exceeded.

According to particular embodiments of the invention, the torque limiting device 300 may be coupled between a valve assembly 200 and a handwheel assembly 100, as illustrated in FIG. 2. In other embodiments, a torque limiting device 300 may be coupled between a valve assembly 200 and an actuator (not shown). The torque limiting device 300 limits the amount of torque that a handwheel 100 or actuator applies to the stem 210 of the valve assembly, helping to prevent damage to the valve assembly due to excessive application of torque to the handwheel 100. In other embodiments, the torque limiting device 300 may be configured to limit the amount of torque being applied to the handwheel 100 or an actuator by the stem 210 of the valve assembly.

The torque limiting device 300 illustrated in FIG. 2 includes a housing 310 which is removably fixed to a valve assembly 200 by one or more bolts 315 or other fastening devices. The housing 310 includes an opening on an end fixed to the valve assembly and an opening at an opposing end, wherein the openings provide sufficient space for a stem 210 of a valve assembly 200 to be positioned through the openings and into the valve assembly 200. The housing 310 also defines an interior space. Moveable and fixed parts positioned within the interior space limit the amount of torque that can be applied to the stem 210 and, thus, the valve assembly 200.

According to some embodiments of the present invention, a packing material 390 may be positioned within a portion of the interior space of the housing 310. The packing material 390 may be used as a fill material within the housing 310 so that torque limiting devices 300 may be configured to fit different sized actuators and valve assemblies.

A drive mechanism 380 may also be positioned within a portion of the interior space of the housing 310. The drive mechanism 380 may sit in the interior space and include grooves, tongues, threads, or other features capable of moving a stem 210 having threads. For example, the drive mechanism 380 may include a hole in its center with grooves on the inner surface of the center hole, which grooves are matched to fit the threads of a stem 210 being used with the valve assembly. Rotation of the drive mechanism 380 within the interior space acts on the threads of the stem 210, thereby moving the stem 210 upwards or downwards in response to the rotation of the drive mechanism 380.

In some embodiments of the present invention, a slip-clutch device 320 can be positioned in the interior space of the housing 310, positioned over, and removably connected to the drive mechanism 380. When moved, the slip-clutch device 320 causes the rotation of the drive mechanism 380, which in turn moves the stem 210 of the valve assembly. In other embodiments, the drive mechanism 380 may be incorporated with the slip-clutch device 320, thereby eliminating a need for an additional component in the torque limiting device 300.

Figure 3:
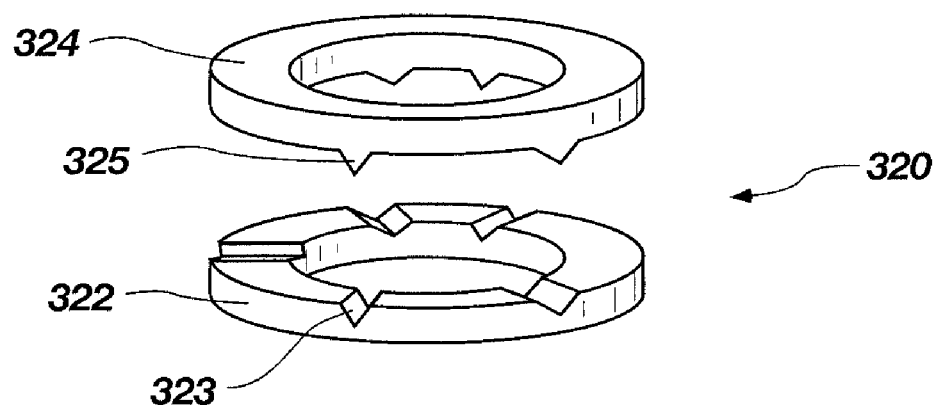
FIG. 3 illustrates a particular embodiment of a slip-clutch for use with torque limiting devices of the present invention.

In some embodiments of the present invention, a slip-clutch device 320 may include a drive plate 322 and a slip plate 324, as illustrated in FIG. 3. The drive plate 322 may include one or more receiving grooves 323 or other receptors configured to receive projections 325 of the slip plate 324. The drive plate 322 and the slip plate 324 may be positioned such that the projections 325 sit within the receiving grooves 323. When positioned in such a manner, the two plates may move as a single unit. The drive plate 322 may be removably attached to the drive mechanism 380 such that movement of the drive plate 322 invokes movement of the drive mechanism 380. Alternatively, the drive plate 322 may include the components of the drive mechanism 380 such that a separate drive mechanism 380 is not required.

The drive plate 322 may include multiple receiving grooves 323. According to some embodiments of the present invention, the drive plate 322 includes one or more such receiving grooves for accepting or receiving a projection 325 of the slip plate 324.

The receiving grooves 323 may be identical to each other or individual receiving grooves 323 may include different configurations. By way of example and not limitation, a drive plate 322 may include two receiving grooves 323: a first receiving groove having a first size and a second receiving groove having a second size. The corresponding slip plate 324 may include two projections 325 having different configurations: a first projection having a configuration capable of mating with the first receiving groove and a second projection having a configuration capable of mating with the second receiving groove, but not the first receiving groove. Thus, in order to properly mate and rotate the slip-clutch device 320, the first projection must sit in the first receiving groove and the second projection must sit in the second receiving groove. Upon the application of an excessive amount of torque to the torque limiting device 300, the first and second projections will slip out of the first and second receiving grooves, respectively, causing the slip-clutch device 320 to disengage and discontinue rotation of the drive mechanism 380. When disengaged, rotation of a handwheel or actuator will continue to rotate the slip plate 324 until the projections 325 of the slip plate 324 again sit in corresponding receiving grooves 323. Continued rotation in excess of the torque limits can again result in disengagement of the slip-clutch device 320.

In other embodiments, the receiving grooves 323 of the drive plate 322 and the projections 325 of the slip plate 324 may be formed with configurations similar to those illustrated in FIG. 3. Thus, if the slip plate 324 becomes disengaged from the drive plate 322 due to excessive torque, only a partial rotation of the slip plate 324 will be required before a projection 325 mates with a receiving groove 323 and the slip-clutch device 320 is reengaged. Accordingly, a specific or desired amount of rotation of the slip plate 324 can be contemplated before reengagement with the drive plate 322 takes place. The particular amount of rotation can be determined or designed by the relative configuration of the receiving grooves 323 and projections 325 of the slip-clutch plates.

Other embodiments of the present invention may include alternative slip-clutch configurations. For example, a slip-clutch device 320 may include ball bearings or cylindrical bearings that fit within holes of a slip-clutch plate that is, in turn, removably attached to the drive mechanism 380. Upon application of excessive force, the ball bearings or cylindrical bearings may slip out of the holes, disengaging the slip-clutch device 320. Other slip-clutch devices 320, as known, can also be used with embodiments of the present invention.

A defeater spacer 330 may be removably or permanently fixed to the slip-clutch device 320 for imparting movement to the slip plate 324 of the slip-clutch device. Alternatively, other mechanisms for imparting rotational forces from a handwheel 100 or actuator to the slip-clutch device 320 may be employed with embodiments of the present invention. The defeater spacer 330 illustrated in FIG. 2 may also include vertically oriented teeth capable of receiving mating vertically oriented teeth of a pressure nut 360. According to certain embodiments of the present invention, the attachment of the defeater spacer 330 to the slip-clutch device 320 permits springs 350 to be placed within the interior space or a spring set space of the housing 310 and in contact with the slip-clutch device 320.

One or more springs 350 may be placed within the interior space of the housing 310 over the slip-clutch device 320. In some embodiments, the springs 350 can be positioned in a space defined by a defeater spacer 330 and an interior wall of the housing 310. The upper boundary of the space may be defined by a pressure nut 360, as illustrated in FIG. 2, while the lower boundary of the space may be defined by an upper surface of the slip plate 324. The springs 350 exert a force on the slip plate 324.

According to embodiments of the invention, the amount of force exerted by springs 350 on the slip plate 324 may be altered by increasing or decreasing the number, size, or force of the springs 350 used. For example, the springs 350 illustrated in FIG. 2 include three Belleville springs placed in series. Other combinations of Belleville springs in series, parallel, or a combination of series and parallel could also be used to achieve the desired force for the torque limiting device 300. In addition, shims or other components could be combined with the springs 350 to adjust the amount of force exerted upon the slip-clutch device 320. It is understood that many different types of springs 350 or other components could be used in place of the Belleville springs illustrated in FIG. 2 and that such use is encompassed by the present invention.

As illustrated in FIG. 2, a pressure nut 360 is positioned in the interior space of the housing 310. The pressure nut 360 is capable of rotating within the housing 310 and is in communication with the handwheel 100 or with an actuator. As the handwheel 100 or actuator rotates, the pressure nut 360 also rotates. An o-ring 362 may be included in communication with the pressure nut 360 and the housing 310. The pressure nut 360 may also be in communication with the defeater spacer 330 and is capable of tuning the defeater spacer 330 to impart rotation to the slip-clutch device 320 as a result of the rotation of a handwheel 100 or an actuator. In some embodiments, the pressure nut 360 may include a flange 360A that may have vertically oriented teeth capable of fitting with the vertically oriented teeth of the defeater spacer 330. Rotation of the pressure nut 360 imparts a force on the flange 360A which, in turn, imparts a force on the defeater spacer 330, rotating the defeater spacer 330 in the same direction as the pressure nut 360. Rotation of the defeater spacer 330 imparts a rotational force on the slip plate 324, thereby turning the slip-clutch device 320 as long as the torque limits of the torque limiting device 300 are not exceeded.

An attachment 370 can be removably connected to the housing 310 by bolts 375. The attachment 370 may hold the pressure nut 360 in a desired position within the housing 310. The size and placement of the attachment 370 may dictate where the pressure nut 360 is located within the housing 310.

The pressure nut 360 may also define the upper bounds of the space within which the springs 350 in the housing 310 may move. As illustrated in FIG. 2, the upper bounds of the space containing springs 350 is defined by the pressure nut 360. If the pressure nut 360 is adjusted upwards, less force is placed on the springs 350. If the pressure nut 360 is adjusted, or positioned, further into the housing 310, then additional force is applied to the springs 350. The amount of force exerted by springs 350 corresponds to the torque limits that will be allowed by the torque limiting device 300 because the force exerted by springs 350 holds the slip plate 324 in place. If the amount of torque placed on the slip-clutch device 320 exceeds the amount of force applied to the slip plate 324, the slip plate 324 will slip from its mating position with the drive plate 322, thereby preventing further movement of drive mechanism 380.

According to embodiments of the present invention, the torque limits of the torque limiting device 300 may be adjusted in numerous ways. For example, the torque limits may be adjusted by selecting the type and strength of springs 350 placed in the housing 310. In other instances, the torque limit may be adjusted by positioning the pressure nut 360 at a desired location within the housing 310 to impart a desired force against the springs 350 and the slip-clutch device 320.

According to some embodiments of the invention, a slip-clutch override mechanism is provided. The slip-clutch override mechanism holds the slip-clutch device 320 in a fixed position, preventing the slip-clutch device 320 from slipping. When engaged, the slip-clutch override mechanism allows an amount of torque greater than the torque limits of the torque limiting device 300 to be imparted to the valve assembly 200.

For example, a representative slip-clutch override mechanism according to a particular embodiment of the invention is illustrated in FIG. 2. The slip-clutch override mechanism includes one or more pins 410 positioned within one or more openings in the housing 310 of the torque limiting device 300. The openings in the housing 310 correspond to the positioning of the slip plate 324 within the housing 310. The side portion of the slip plate 324 next to the housing 310 includes a groove 326 within which the pins 410 may fit when the slip plate 324 is mated with the drive plate 322. In other words, when the projections 325 of the slip plate 324 are positioned in the receiving grooves 323 of the drive plate 322, the groove 326 in the slip plate 324 corresponds to and aligns with the openings in the housing 310. Exerting a force upon the pins 410 towards the housing 310 may force the pins 410 into the groove 326 of the slip plate 324. When the pins 410 are positioned in the groove 326 of the slip plate 324, the slip plate 324 is locked in a mated position with the drive plate 322. For example, activation of the pins 410 secures the slip plate 324 in a mated position with the drive plate 322, preventing the slip plate 324 from slipping and allowing an increased amount of torque to be applied to the valve assembly. Thus, activation of the slip-clutch override mechanism will allow an amount of torque greater than the torque limits of the torque limiting device 300 to be applied to the valve assembly 200.

In other embodiments of the invention, the pins 410 may be positioned in holes in the housing 310 which are directly above the slip plate 324. Activation of the pins 410 into the housing 310 positions the pins 410 directly above the slip plate 324 to prevent movement of the slip plate 324. In this fashion, an increased amount of torque may be applied to the valve assembly 300 when the pins 410 have been activated.

In yet other embodiments, a pin may be deployed through the pressure nut 360 to exert a force on the slip plate 324, which locks the slip plate 324 in a mated position with the drive plate 322.

According to still other embodiments of the invention, additional mechanisms may be used to override the slip-clutch device 320 and allow torque to be applied to a valve assembly which torque exceeds the torque limits of the torque limiting device 300.

Embodiments of the invention may additionally include a "tattletale" indicator or device for determining whether the torque limits on a valve assembly 200 have been, or may have been, exceeded. For example, with embodiments of the invention employing the slip-clutch override mechanism illustrated in FIG. 2, the pins 410 may be configured such that, once deployed, they are permanently positioned in the locking position. Thus, visual inspection of the positioning of the pins indicates that the torque limitations of the valve assembly 200 may have been exceeded.

In other embodiments, the openings in the housing 310 containing the pins 410 may include breakable seals which are intact until one or more pins 410 are activated to engage the slip-clutch override mechanism. Upon activation of a pin 410 into the groove 326 of the slip plate 324, the breakable seal (not shown) is broken. Even if an activated pin 410 is pulled out to its original position, the broken seal will act as a tattletale, indicating that at some point, the slip-clutch override mechanism had been activated and that the torque limits of the valve assembly 200 may have been exceeded.

In other embodiments, the tattletale may include an indicator in the groove 326 of the slip plate 324. For example, a soft material, such as wax or other substance, may be positioned in a portion of the groove 326. Upon activation of a pin 410, at least a portion of the soft material may be displaced, moved, or disturbed, such that upon disassembly of the torque limiting device 300, visual inspection of the soft material in the groove 326 will indicate the disturbance and the previous activation of the slip-clutch override mechanism.

In still other embodiments, the tattletale may be constructed of a crushable material. In some instances, the crushable material may be crushed by the activation of a pin 410. In other instances, the crushable material may be selected such that it will be crushed upon an exertion of an amount of torque exceeding the torque limits of the valve assembly 200. Such a material may be inserted between the slip-clutch device 320 and the drive mechanism 380, or at another position within the torque limiting device 300.

According to particular embodiments of the invention, other tattletale devices may also be used. For example, any torque limiting device 300 including a tattletale or an equivalent device or mechanism that indicates that the slip-clutch override mechanism has been activated is encompassed by the present invention.

Although the illustrated embodiments show one type of valve assembly and a single configuration of a torque limiting device 300, it is understood that the torque limiting devices 300 of the present invention may be configured to fit numerous valve assemblies 200, regardless of the size, shape, configuration, or design of such assembly.

It is understood that illustrated handwheel 100 represents a single type and configuration of a handwheel 100. Torque limiting devices 300 according to the present invention may be modified or configured to fit handwheels 100 having different sizes, shapes, and configurations than the handwheel 100 illustrated in FIG. 2. Further, the handwheel 100 used with embodiments of the invention may be replaced by a handle or other device capable of applying a rotational or other force to the torque limiting device 300. In addition, torque limiting devices 300 according to embodiments of the present invention may be modified or configured to fit valve assemblies 200 employing the use of actuators instead of, or in addition to, handwheels.

Having thus described certain currently preferred embodiments of the present invention, it is understood that the invention defined by the appended claims is not to be limited by particular details or examples set forth in the above description, as many apparent variations thereof are contemplated without departing from the spirit or scope thereof as hereinafter claimed.

What is claimed is:

1. A torque limiting device for a valve assembly, comprising:
    a housing;
    a slip-clutch device positioned within the housing;
    a force generating device positioned within the housing and imparting a force on the slip-clutch device;
    an override mechanism in communication with the housing, wherein the override mechanism may be activated to prevent slippage of the slip-clutch device and wherein the override mechanism comprises at least one pin positioned in a hole in the housing and extending outside the housing.

2. The torque limiting device of claim 1, wherein the force generating device comprises at least one spring.

3. The torque limiting device of claim 1, wherein the force generating device comprises at least one Belleville spring.

4. The torque limiting device of claim 1, wherein the slip-clutch device comprises:
    a slip plate; and
    a drive plate in communication with the slip plate.

5. The torque limiting device of claim 4, wherein the drive plate further comprises a drive mechanism integrated with the drive plate for driving a valve stem.

6. A torque limiting device for a valve assembly, comprising:
    a housing;
    a slip-clutch device positioned within the housing;
    a force generating device positioned within the housing and imparting a force on the slip-clutch device;
    an override mechanism in communication with the housing, wherein the override mechanism may be activated to prevent slippage of the slip-clutch device, and wherein the override mechanism comprises:
    a hole in the housing, wherein the hole extends from an outer portion of the housing to an interior portion of the housing; and
    a pin positioned part way through the hole in the housing, wherein the positioning of the pin does not extend to an interior portion of the housing.

7. The torque limiting device of claim 6, further comprising a plurality of holes having a plurality of pins positioned part way therein.

8. The torque limiting device of claim 6, further comprising a breakable seal positioned in the hole between the interior portion of the housing and an end of the pin positioned part way through the hole, wherein activation of the override mechanism breaks the breakable seal.

9. The torque limiting device of claim 6, wherein the hole is positioned just above the slip-clutch device such that activation of the override mechanism positions the pin into an interior portion of the housing above the slip-clutch device and prevents the slip-clutch device from slipping.

10. The torque limiting device of claim 6, wherein the hole is positioned adjacent to the slip-clutch device in the housing such that activation of the override mechanism engages the pin with the slip-clutch device preventing slippage of the slip-clutch device.

11. The torque limiting device of claim 1 further comprising a tattletale device, wherein the tattletale device indicates whether the override mechanism has been activated.

12. A torque limiting device for a valve assembly, comprising:
    a housing;
    a slip-clutch device positioned within the housing;
    a force generating device positioned within the housing and imparting a force on the slip-clutch device;
    an override mechanism in communication with the housing, wherein the override mechanism may be activated to prevent slippage of the slip-clutch device; and
    a tattletale device comprising a crushable material that is crushed when the override mechanism is activated.

13. A torque limiting device for a valve assembly, comprising:
    a housing;
    a slip-clutch device positioned within the housing;
    a force generating device positioned within the housing and imparting a force on the slip-clutch device;
    an override mechanism in communication with the housing, wherein the override mechanism may be activated to prevent slippage of the slip-clutch device; and
    a tattletale device comprising a soft material that is moved or displaced when the override mechanism is activated.

14. A torque limiting device for a valve assembly, comprising:
    a housing;
    a slip-clutch device positioned within the housing;
    a force generating device positioned within the housing and imparting a force on the slip-clutch device;
    an override mechanism in communication with the housing, wherein the override mechanism may be activated to prevent slippage of the slip-clutch device; and
    a tattletale device comprises a seal that is broken when the override mechanism is activated.

15. A torque limiting device, comprising:
    a housing having an outer surface and a substantially cylindrical inner surface;
    a substantially planar drive plate disposed within the housing at a fixed longitudinal position therein, wherein the drive plate comprises an outer cylindrical surface disposed adjacent the substantially cylindrical inner surface of the housing and at least one receiving groove;
    a substantially planar slip plate disposed within the housing adjacent the drive plate, wherein the slip plate is moveable in a longitudinal direction within the housing and comprises an outer cylindrical surface disposed adjacent the inner surface and at least one projection for mating with the at least one receiving groove of the drive plate;
    at least one spring configured to press the slip plate against the drive plate; and
    an override mechanism in a deactivated position, wherein the override mechanism is configured to prevent the longitudinal movement of the slip plate when activated, wherein the override mechanism further comprises:
    at least one passage extending through the housing outer surface and substantially cylindrical inner surface; and
    at least one pin positioned partially into the at least one passage, wherein the pin does not extend beyond the substantially cylindrical inner surface.

16. The torque limiting device of claim 15, further comprising a tattletale device, wherein the tattletale device evidences activation of the override mechanism.

* * * * *